United States Patent [19]
Yamane et al.

[11] Patent Number: 5,701,580
[45] Date of Patent: Dec. 23, 1997

[54] INFORMATION PROVIDING SYSTEMS AND PORTABLE ELECTRONIC DEVICES

[75] Inventors: Kazuyasu Yamane, Hamura; Takashi Orimoto, Akiruno, both of Japan

[73] Assignee: Casio Computer Co., Ltd., Tokyo, Japan

[21] Appl. No.: 565,781

[22] Filed: Dec. 1, 1995

[30] Foreign Application Priority Data

Dec. 9, 1994 [JP] Japan .................... 6-306033
Sep. 22, 1995 [JP] Japan .................... 7-244689

[51] Int. Cl.[6] .................................. H04Q 7/00
[52] U.S. Cl. .................. 455/3.1; 455/54.2; 340/825.27; 340/825.44
[58] Field of Search .................. 455/3.1, 66, 54.2; 348/6, 7, 12; 340/825.22, 825.27, 825.47, 825.44

[56] References Cited

U.S. PATENT DOCUMENTS

| | | | |
|---|---|---|---|
| 5,038,211 | 8/1991 | Hallenbeck | 348/906 |
| 5,173,688 | 12/1992 | DeLuca et al. | 340/825.44 |
| 5,253,275 | 10/1993 | Yurt et al. | 348/7 X |
| 5,303,393 | 4/1994 | Noreen et al. | 455/54.2 |
| 5,351,075 | 9/1994 | Herz et al. | 348/1 |
| 5,390,362 | 2/1995 | Modjeska et al. | 455/38.1 |
| 5,475,374 | 12/1995 | Moore | 340/825.22 |

*Primary Examiner*—John K. Peng
*Assistant Examiner*—Nathan J. Flynn
*Attorney, Agent, or Firm*—Frishauf, Holtz, Goodman, Langer & Chick

[57] ABSTRACT

A service center has a plurality of controlled areas. When the service center provides service information through a radio communication network, the service center first broadcasts toward all the areas with outline items of the information with corresponding key codes attached thereto. Users each receive the outline items of the information with a user's terminal and determine as required whether a detail item of the information should be had immediately (an urgent one) or can be had later (a regular one). The results of the determination are reported to the service center, which immediately provides the urgent detail items of the information for the respective users who made requests for having those detail items. The service center broadcasts regular detail items of the information with attached corresponding key codes other than the requested urgent ones of the information toward the terminals which requested the regular detail items of the information at a predetermined time. Each terminal has stored a key code attached to the outline item of the information which the terminal requested in a regular manner, and receives only a necessary detail item of the information.

22 Claims, 10 Drawing Sheets

Headline 10.24.1994 NEWS

1. Hike in official rate.
2. Portable phone subscribers have exceeded 300 millions in number.
3. GIANTS win.
4. Big earthquake occurred in South America.

◁ ▷ | PROMPT | REGULAR | EXE

23 — 
25 —
27 —

⇒

Portable phone subscribers have exceeded 300 millions in number.

According to data published by a search company the other day, portable phone subscribers in Japan have exceeded ...

Headline 10.24.1994 TOUR

1. Golf & hot springs.
   Night lodging at Shimoda for ¥30,000.
2. X'mas dinner show at Hotel ABC.

◁ ▷ | PROMPT | REGULAR | EXE

24 — 
26 —
27 —

⇒

Golf package tour at Shimoda

International Shimoda G.C
¥32,500 → ¥30,000
OP. Feast plan + ¥7,500
A bottle of wiskey is served free to golf players if they exceed 10 in number.
TEL:03(3000)1111

| | | REQUEST KEY n {42} | | | |
|---|---|---|---|---|---|
| | | $n_1$ | $n_2$ | $n_3$ | $n_4$ |
| AREA m {41} | A | 0 | 10 | 3 | 7 |
| | B | 0 | 0 | 0 | 0 |
| | C | 0 | 19 | 15 | 2 |

| | n1 | n2 | n3 | n4 |
|---|---|---|---|---|
| TOTAL | 0 | 30 | 18 | 9 |

INFORMATION PROVIDING SYSTEMS AND PORTABLE ELECTRONIC DEVICES

BACKGROUND OF THE INVENTION

1. Field of the Invention

The present invention relates to an information providing system which provides information from a service center through a radio network to electronic devices present in a radio area, and a portable electronic device for use with the information providing system.

2. Background Art

Conventionally, there is a communication information service which is provided to portable radio terminals with a display, so-called pagers. This service takes the form of a so-called one-way communication which provides information undirectionally through a radio network from the service center to portable radio terminals. In this information providing system, the service center simultaneously transmits (or broadcasts) detailed information involved in the service of the system to unspecified users as subscribers who use portable radio terminals.

However, the subscribers are forced to receive up to unnecessary information from the one-way communication information service provided by the pager, so that it takes much time for the subscribers to select necessary information and the pager requires a memory having a large capacity sufficient to store up to unnecessary information, disadvantageously.

Individual transmission of different items of information which the respective users desire to the users would increase communication traffic.

SUMMARY OF THE INVENTION

It is therefore an object of the present invention to provide an information providing system which suppresses an increase in the communication traffic and provides the subscribers with flexible service.

In order to achieve the above object, the present invention provides an information providing system using a radio network, comprising:

at least one terminal;

a service center for providing the at least one terminal with information through the radio network such that the service center provides the at least one terminal with respective outline items of information in first transmission and respective detailed items of information in second transmission; and the terminal comprising:

selection means for selecting by user's manipulation a necessary outline item of information from among the information provided in the first transmission; and reception means for accepting only a detailed item of information corresponding to the outline item of information selected by the selection means from among the detailed items of information provided in the second transmission.

It is a second object of the present invention to provide an electronic device for use with the information providing system.

In order to achieve the second object, the present invention provides an electronic device for use with an information providing system where a service center provides the electronic device with a plurality of items of information through a radio network such that the service center provides respective outline ones of the plurality of items of information in first transmission and respective detailed ones of the plurality of items of information an second transmission, comprising:

reception means for receiving the plurality of items of information through the radio network from the service center;

selection means for selecting a necessary one from among the outline ones of the plurality of items of information provided in the first transmission; and means for accepting only a detailed item of information corresponding to the outline item of information selected by said selection means among from the detailed ones of the plurality of items of information provided in the second transmission.

BRIEF DESCRIPTION OF THE DRAWINGS

FIG. 4 illustrates the structure of communication data broadcast from a service center.

FIG. 5 shows received data displayed on a display of a portable terminal.

DESCRIPTION OF THE PREFERRED EMBODIMENTS

Figure 1:
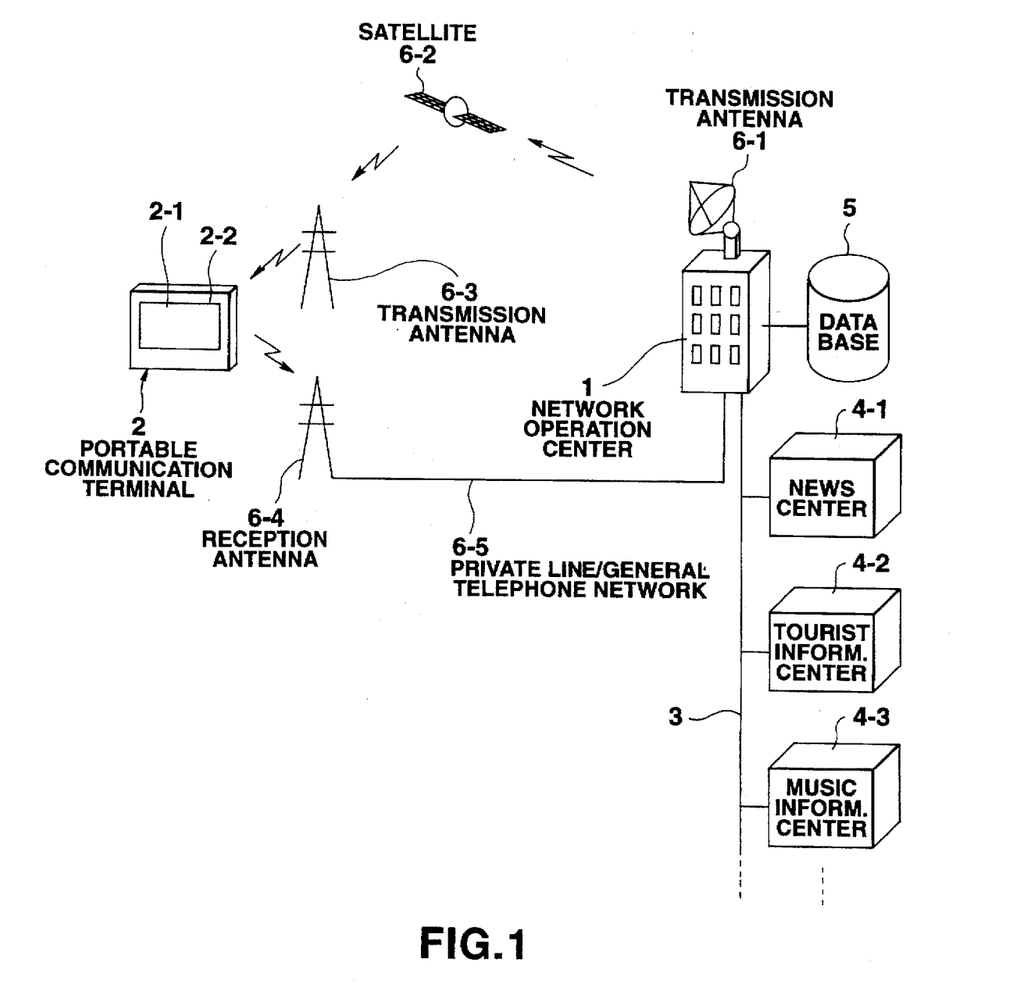
FIG. 1 is a block diagram indicative of the structure of an information providing system as a first embodiment of the present invention.

Description of the Whole System:

FIG. 1 is a block diagram of the structure of an information providing system as a first embodiment. As shown in FIG. 1, the information providing system includes a network operation center 1, a plurality of portable communication terminals 2 (only one is shown), and a radio communication network which connects the network operation center 1 and the portable terminals 2.

The network operation center 1 has an internal service center (not shown), which is connectable through a network to a terminal 2. The service center is connected through the network operation center 1 by means of a line 3 to a plurality of information centers. The information centers are business-dedicated information ones, which provide various information, and include, for example, a news center 4-1 which provides information, for example, on especially striking accidents in Japan and foreign countries in news articles; a tourist information 4-2 which provides information on hotels, inns, and tourist homes in pleasure resorts, and reservations and time-tables of package tours, hotels and airplanes; a music information center 4-3 which provides information on introduction to new music, hit charts, concerts to be held in local districts, etc.; a shopping center (not shown) which reports information on sales in larger- and smaller-retail shops such as department stores and discount stores and on mail-order goods; a weather forecasting center which forecast weather from today on in local areas; and a stock market condition service center (not shown) which reports the market prices of spots and futures of listed stocks. Each service center has a database 5 which shows the content of a contract made between the service center and a user which utilizes the information service.

Generally, the portable terminal 2 has the outer form of a programmable operation display (POD) which has the function of transmitting/receiving a radio signal, and has a liquid crystal display 2-1, for example, of a dot matrix type which displays various information on its front, and a touch-in unit 2-2 including a pressure-sensitive or electromagnetically induced type tablet extending over the whole surface of the display 2-1. The terminal 2 transmits/receives direction and service information following the ID number of the terminal to display received service information on the display 2-1. The terminal 2 is usable as an electronic notebook or a computer when it transmits/receives no data. In addition, the user can enjoy various games by replacing application ROM (Read Only Memory) cards with other ones.

The network which connects the service center and the terminals 2 includes a parabolic transmission antenna 6-1, a communication satellite 6-2, a tower type transmission antenna 6-3, a tower type reception antenna 6-4, a private line or a line 6-5 of a general telephone network which connects the reception antenna 6-4 and the network operation center 1. The service center transmits service information through the transmission antenna 6-1, satellite 6-2 and transmission antenna 6-3 and receives a response from the terminal 2 through the reception antenna 6-4 and line 6-5.

Figure 2:
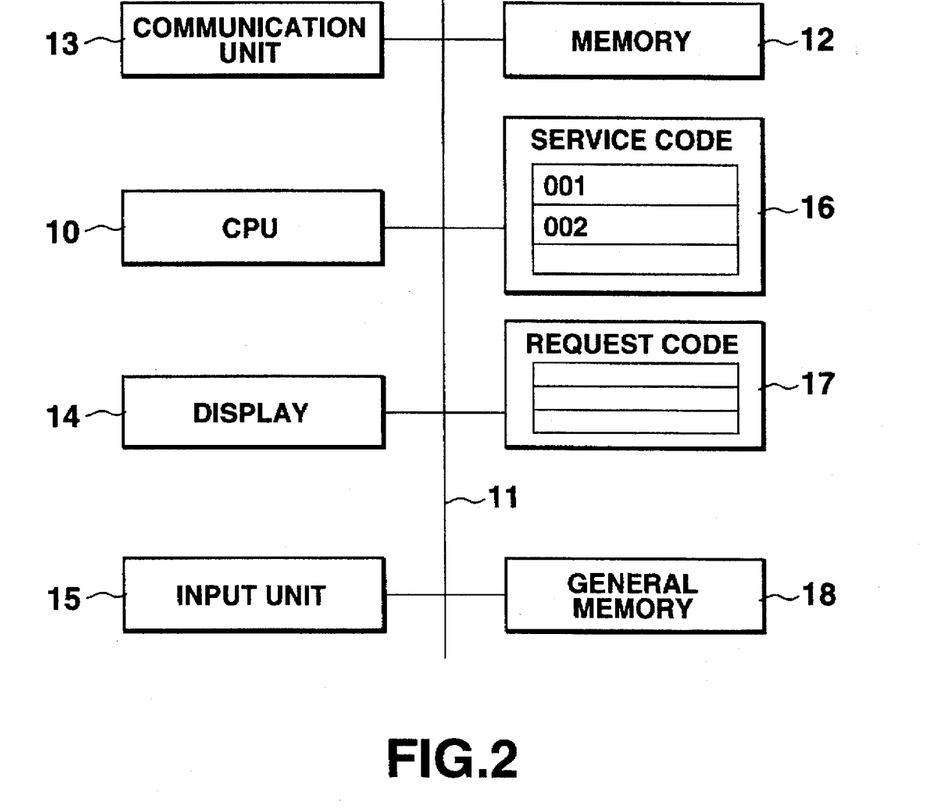
FIG. 2 is a block diagram indicative of the circuit structure of a portable terminal used in the first embodiment.

FIG. 2 is a block diagram indicative of the internal circuit structure of the terminal 2. In FIG. 2, a CPU (Central Processing Unit) 10 performs various operations. The CPU 10 is connected through a bus 11 to an ID memory 12, communication unit 13, display 14, input unit 15, service code memory 16, request code memory 17 and general memory 18.

The ID memory 12 is a fixed type one which contains an specified address number as the call number of the terminal.

The communication unit 13 is comprised of an antenna, receiving unit and sending unit. The antenna receives a radio signal (service information) sent by the transmission antenna 6-3 or transmits a radio signal (direction data) output from the terminal 2. The receiving unit detects, amplifies and demodulates the received signal and converts the resulting signal to serial digital data composed of 0's and 1's. The sending unit encodes direction data corresponding to position coordinate data input by touching from the input unit 15 or stored predetermined data, adds an ID code to the encoded data thus obtained, converts the resulting data to serial data, and sends this serial data on a carrier wave having a predetermined frequency through the antenna.

Display 14 is comprised of the display screen, a display memory (not shown), etc., and displays received service information, or service information read from the memory 18 on the display screen.

The input unit 15 includes the touch-in unit 2-2 of FIG. 1, which detects a position on the display which a pen or a finger tip has touched data and outputs its coordinate data to the CPU 10.

The service code memory 16 stores one or more service codes to be described later in more detail.

The request code memory 17 stores one or more service codes to be also described later in more detail.

The memory unit 18 has a ROM (Read Only Memory) area and RAM (Random Access Memory) area. The ROM area contains a control program. The RAM area stores received service information, various application software such as game software and modified function software read from a removable IC card or the like. The CPU 10 controls the respective components of a terminal on the basis of a touch input signal from the input unit 15 or an interrupt signal received from the communication unit 13 in accordance with a program read from the ROM of the memory unit 18, and performs various processes such as display of service information read from the RAM of the memory 18 on the display 14.

Figure 3:
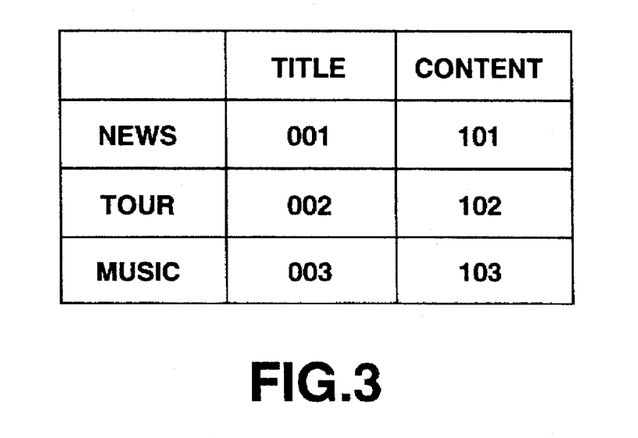
FIG. 3 illustrates a service code recorded for a portable terminal to receive an information service from a service center.

FIG. 3 illustrates a service code to be recorded for the terminal 2 to receive an information service from the service center. The service code includes title codes and content codes corresponding to respective service information transmitted from the service center. The title code is attached to data indicative of the outline of information and the content code is attached to data indicative of the detail content of information. In the example of FIG. 3, title codes "001", "002" and "003" and content codes "101", "102" and "103" are determined for news, tour and music service items, respectively, of information. When the user of a terminal 2 contracts with the service center for desired information service, and when the user desires to receive only the title (outline) data of desired service information in a first broadcast, the title code is recorded while when the user desires to receive desired content (detail) data of service information from the beginning, the content code is recorded. More specifically, when the user contracts for a news information service and desires to receive only the outline of news information in the first broadcast, "001" is recorded while when the user desires to receive the detail data from the beginning, "101" is recorded. These codes are recorded in the service code memory 16 of the terminal 2 of FIG. 2 by the service center when the user contracts with the service center for the user's desired information service.

Figure 4A:
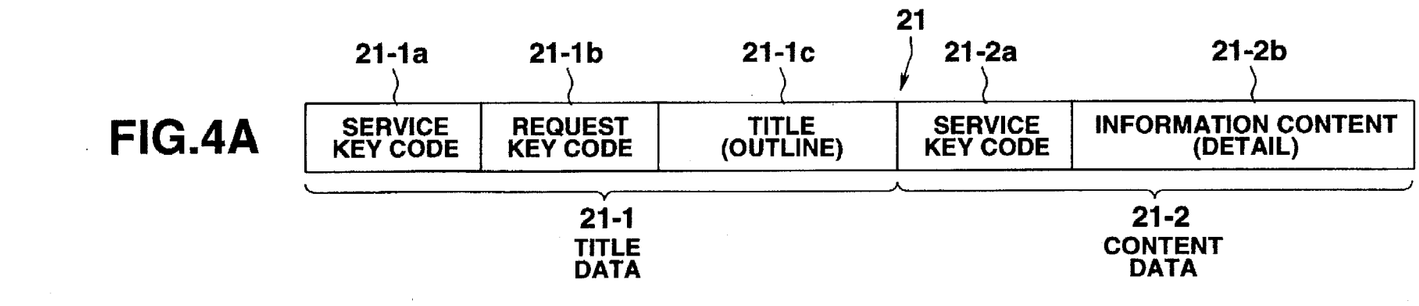
FIG. 4A shows the structure of communication data transmitted in first broadcasting.
Figure 4B:
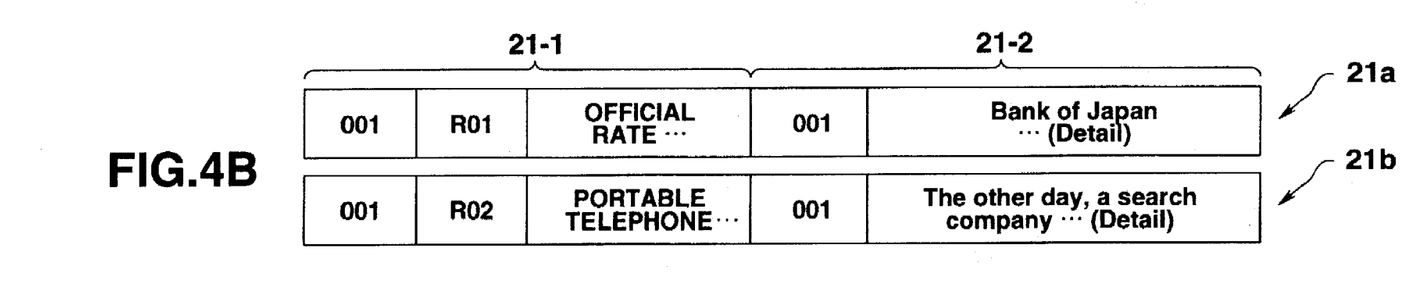
FIG. 4B illustrates two specified contents of the communication data.
Figure 4C:
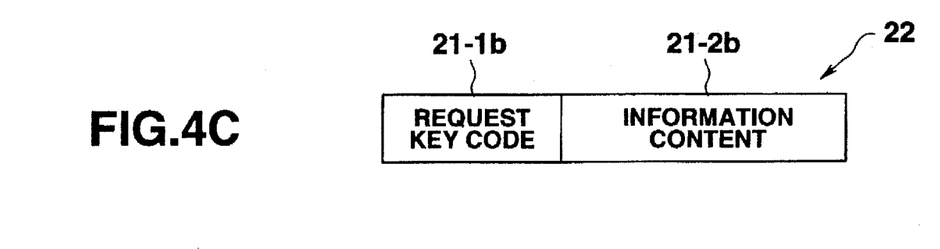
FIG. 4C shows the structure of communication data transmitted in second broadcasting.

Structure of Transmission Data:

FIGS. 4A, 4B, 4C each show the structure of data transmitted from the service center. FIG. 4A shows the structure of data transmitted in a first broadcast; FIG. 4B shows two specified examples of the data as news; and FIG. 4C shows the structure of data transmitted in a second broadcast.

As shown in FIG. 4A, the data 21 provided in the first broadcast is composed of title data 21-1 and content data 21-2. The title data 21-1 is composed of data on a service key code 21-1a, a request key code 21-1b and a title (outline, heading) 21-1c. The service key code 21-1a is the same as the title code of FIG. 3. For example, as shown in the data 21a, 21b of FIG. 4B, when the data 21 is news information on an "official rate" and a "portable telephone", a code "001" indicative of the news information is set as a service key code 21-1a.

The request key code 21-1b changes depending on each title data 21-1c and is attached to that title data. For example, a key code "R01" is set for title data of news information on the "official rate" while a code "R02" is set for title data of news information on the "portable telephone" (FIG. 4B).

As shown in FIG. 4B, the title 21-1c is composed of characters which describe a title for each item of service information.

The content data 21-2 is composed of data on a service key code 21-2a and data on an information content (detail) 21-2b. The service key code 21-2a for the information content is the same as the content code of FIG. 3. If the communication data 21 is news information, a code "101" indicative of the content (detail) of the news information is stored.

The information content 21-2b is composed of character data which describes, for example, a prompt report on the today's official rate published by the Bank of Japan such as "The Bank of Japan..." as detailed news on the official rate and exchange market condition. For example, the information content 21-2b is composed of character data which describes, for example, the market movement on portable telephone sets fashionable now such as "The other day, a search company..." as news on portable telephone sets.

As shown in FIG. 4C, the communication data 22 transmitted in a second broadcast from the service center is composed of data on a request key code 21-1b and information content 21-2b of FIGS. 4A and B, respectively.

Figures 5A, 5B:
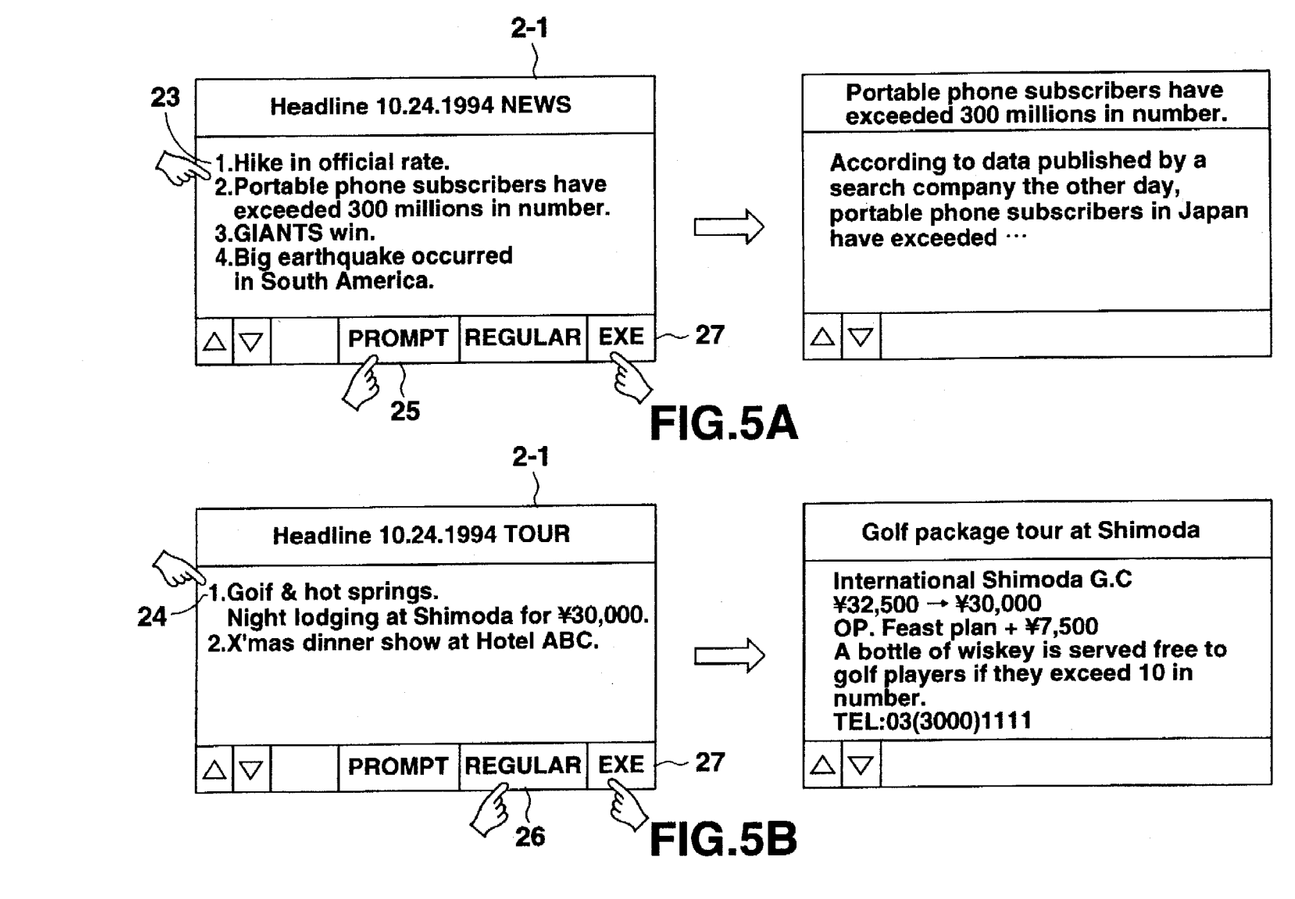
FIG. 5A shows a display of data received by a portable terminal which has contracted for a news information service.
FIG. 5B shows a display of data received by a portable terminal which has contracted for a tour information service.

FIGS. 5A and 5B show two corresponding examples of received data displayed on the display 14 (liquid crystal display 2-1) of the portable terminal 2. FIG. 5A shows the displayed example of data provided by the news information service while FIG. 5B shows a displayed example of data provided by a tour information service.

Figure 6:
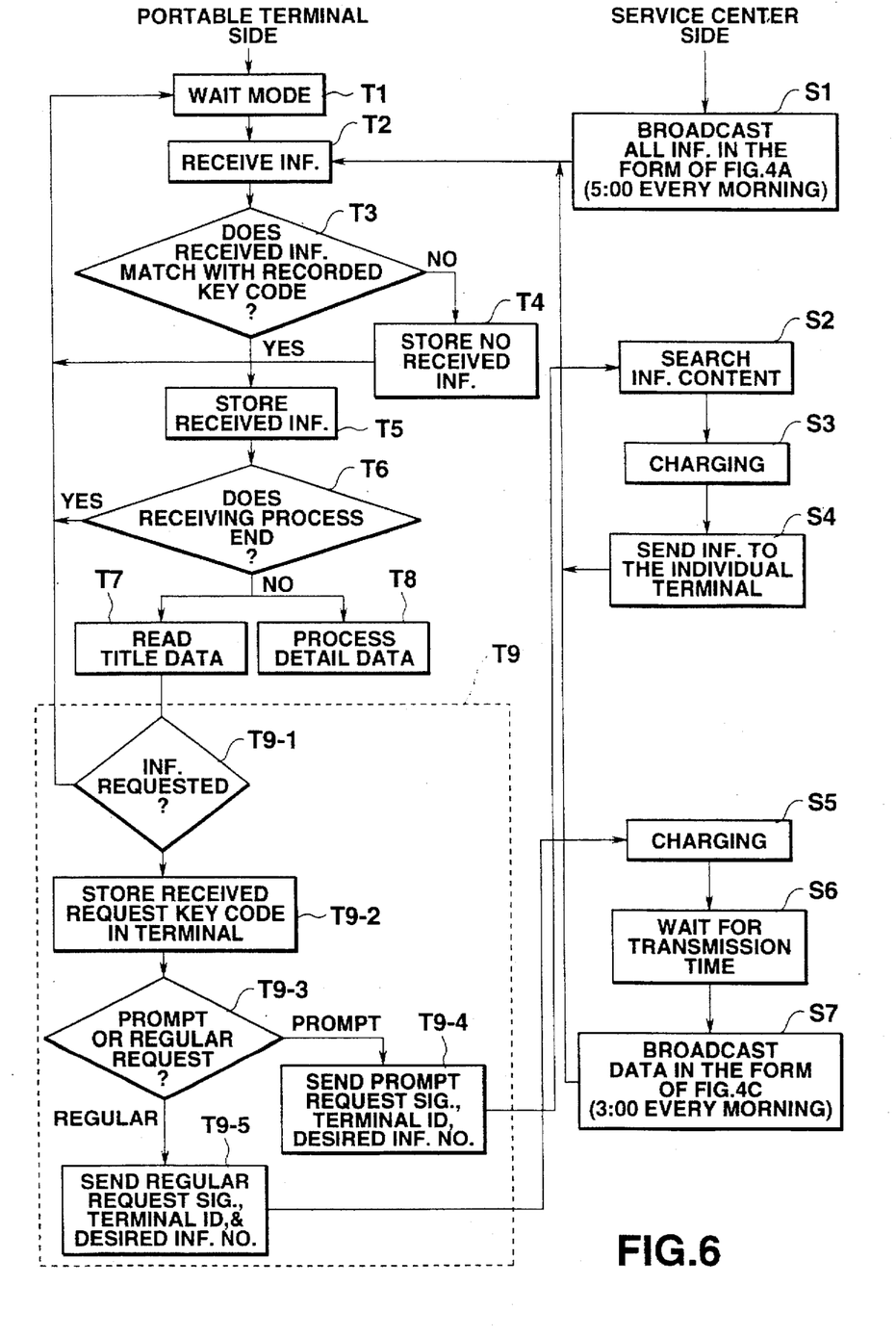
FIG. 6 is a flow chart indicative of the operation of the information providing system as the first embodiment.

Operation of the System:

FIG. 6 is a flow chart indicative of the operation of the information providing system of this embodiment. The process advances on the basis of the mutually related operations of the service center and the terminal 2.

First, the terminal 2 is set in a reception wait mode in which the terminal 2 waits for reception of a signal from the service center (step T1).

The service center simultaneously transmits detail data of service information with title data, for example, by broadcasting at 5:00 a.m. every morning when a quantity of communication traffic is small (step S1). Thus, communication data 21a, 21b, etc., having the structure of FIG. 4B is broadcast from the service center if the communication data is news. Of course, not only news but also tour information, music information, etc., are transmitted.

Each time the terminal 2 sequentially receives those service information (step T2), it determines whether the service key code of the title 21-1 or the content 21-2 of the received service information (FIGS. 4A and 4B) matches with the service key code recorded in the service code memory 16 of that terminal 2 (step T3).

Assume now that the user has contracted with the service center for acquisition of only the titles of "news" and "tour" provided by the information service in the first broadcast. In this case, codes "001" and "002" have been stored in the service code memory 16 of the terminal 2. Thus, in this case, data on the request code 21-1b and title 21-1c of the received news and tour information are stored in the memory 18 (step T5).

If the user has contracted with the service center for acquisition of the detail content 21-2b from the first broadcast on, the corresponding service code is stored in the service code memory 16. Thus, the terminal 2 stores the detail content 21-2b from the transmitted information in the first broadcast (step T5).

When the service code stored in the terminal 2 does not match with the received key code, the received information is not stored (step T4) and control passes to the processing of the next data to be received.

In this way, when it is determined that the reception process for the information transmitted in the first broadcast ends (step T6), the selectively received information is stored in the memory 18, and control waits for the next user's operation.

When the user performs a predetermined operation to see the received detail data, the detail data stored in the memory 18 is sequentially read and displayed on the display screen, as shown in the right-hand portions of FIGS. 5A and 5B (step T7), so that the detail content of the selected desired service information can be known.

When the user operates the terminal so as to display the received title data, the title data stored in the memory 18 is read and displayed, as shown in the left-hand portions of FIGS. 5A and 5B (step T8). In this case, by the appropriate touch inputs for "△" and "▽", all the stored (received) title data is displayed optionally.

The process at block step T9 shown by broken lines is performed subsequently to the display process. At step T9, first, it is determined whether service information is requested (step T9-1). In this process, it is determined whether, for example, a title such as "1. An official rate . . . " or "2. A portable telephone set . . . " is selected and data on the title has been input by touching in the display shown on the left-hand portions of FIGS. 5A and 5B.

If the data has been input by touching at step T9-1, request key codes contained in the title data of the service information input by touching are sequentially stored in the request code memory 17 (step T9-2). When, for example, "2. A portable telephone set . . . " is input by touching in the displayed state shown in the left-hand portion of FIG. 5A, the request key code "R02" of service information (communication data 21b) on the portable telephone set shown in FIG. 4B is stored in the request code memory 17.

Thereafter, it is determined whether the request for the service information is a prompt one or a regular one (steps T9-3). In this process, it is determined which of the "prompt" and "regular" input keys has been touched in the display state shown in the left-hand of each of FIGS. 5A and 5B.

If the "prompt" key has been touched in this determination ("prompt" at step T9-3), the terminal transmits transmission request data which includes a predetermined prompt report transmission request signal, an ID number (or service subscriber number) of the terminal 2 and an information number (a request key code, for example, "R02" stored in the request code memory 17) for which the information is requested to be transmitted to the terminal (step T9-4). Thus, the service center is required promptly to transmit detail data on the portable terminal.

When the service center receives the transmission request data and recognizes that the data is on a signal which requests a prompt report of the service information, it immediately calls a news center corresponding to the requested information and retrieves service data corresponding to the requested information number (step S2).

When the information service is to be charged for, a charging process is performed in a service account having the ID number attached to the transmission request data (step S3), and the retrieved service information with the ID number attached thereto is transmitted only to the individual terminals 2, which sent the transmission request data to the service center (step S4).

Each appropriate terminal 2 receives the transmission from the service center at step T2, and confirms that the service information has been sent to that terminal 2 to accept the service information at step T3. The terminal then stores the service information in the memory 18 at step T5 and displays it on the display at step T7. As just described above, the user can promptly obtain only the desired urgent information.

If a "regular" input key of the terminal 2 is touched for inputting purposes in the determination ("regular" at step T9-3), the terminal 2 sends transmission request data composed of a predetermined regular transmission request signal, the ID number of the terminal 2 and an information number for which the transmission of the service information is requested (step T9-5). Thus, regular transmission, for example, of detail data on the portable telephone from the service center is requested.

The service center receives the transmission request data and confirms that the data is on a signal which requests regular transmission, the service center checks whether the information service corresponding to the required information number is charged for. If so, the service center performs a charging process in the service account having the ID number attached to the transmission request data (step S5).

The service center waits for arrival of a predetermined transmission time when the communication traffic is idle, for example, 3:00 a.m., next morning (step S6), at which time the service center again broadcasts only the detailed content data of the communication data sent at 5:00 a.m., yesterday morning (FIG. 4C) (step S7).

In this case, the terminal 2 receives the transmission from the service center at step T2, confirms that the service key code of the received service information at step T3 matches with the key code stored in the request code memory 17, accepts that service information, stores it in the memory 18 at step T5, and displays it on the display screen at step T7. As just described above, the user can obtain only desired information which requires no prompt transmission at a regular transmission.

The terminal can only store a necessary request key code by omitting the processing at step T9-5. In this case, the service center attaches request key codes to all the corresponding detail information for the previous day transmits and that in a second broadcast. The terminal accepts only the information whose key code matches with that stored in the request code memory 17 from among the information transmitted in the second broadcast and provides it to the user.

The broadcasting of the information may be performed not only next day but also the first and second broadcasts may be performed at intervals of several hours.

In the first embodiment, when the service center receives the designation of non-urgent information (a regular request) from the user (terminal), the service center broadcasts the designated information at the regular time. In this case, the user's request for transmission of the information is only used as the requirement for transmission of the information or as charging information from the service center.

Second Embodiment:

A regular request for the information by the user may be used as a value added to diversify the information service to thereby improve its degree of utilization. This concept will be realized as a second embodiment which will be described next.

Figure 7:
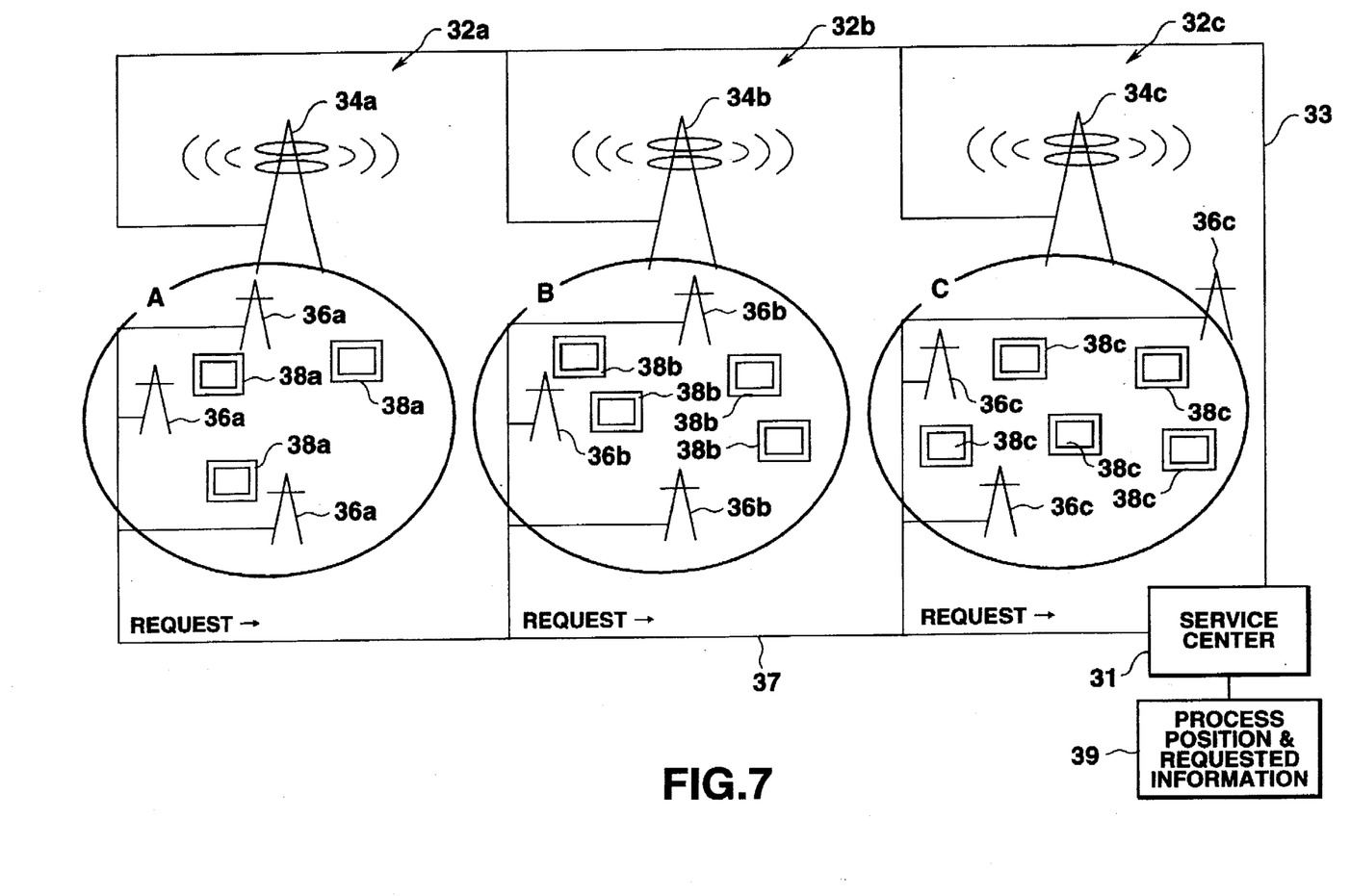
FIG. 7 shows the area structure of an information providing system in a second embodiment.

FIG. 7 shows a structure of an information providing system of the second embodiment. A service center 31 of FIG. 7 is provided in the network operation center 1 of FIG. 1. As shown in FIG. 7, in the second embodiment, the service center 31 has a plurality of controlled areas (in this case, three controlled areas A (32a), B (32b) and C (32c)). The service center 31 has a radio network comprised of a transmission system which includes a transmission line 33, transmission antennas 34a, 34b, and 34c; and a reception system which includes reception antennas 36a, 36b, 36c and a request signal network 37 which includes a dedicated line and a general telephone line. Portable terminals 38 (38a, 38b, 38c) possessed by the users which receive the respective services are movably disposed in the corresponding controlled areas A, B and C.

The transmission line 33, transmission antennas 34 (34a, 34b, 34c), reception antennas 36 (36a, 36b, 36c), request signal network 37 and terminals 38 (38a, 38b, 38c) for the respective areas are similar in structure to the transmission antenna 6-1, satellite 6-2, transmission antenna 6-3, reception antenna 6-4, private line/general telephone network 6-5, and portable information communication terminal 2, respectively, and are controlled in the respective areas. Although the structure of the present embodiment is similar to that of the first embodiment, a reference numeral different from that used in the first embodiment is used to denote the same component in terms of avoidance of complication of the description, as described above.

In such arrangement, the service center 31 simultaneously transmits outline data of service information (title data in the first embodiment) to the plurality of terminals 38 through the transmission line 33 and transmission antennas 34a, 34b and 34c. In response to this transmission, the terminals 38a, 38b and 38c in the areas A, B and C send request signals for the outline data through the request signal network 37 which includes the reception antennas 36a, 36b, 36c and private line/general telephone line to the service center 31, which controls the request signals from the terminals in units of an area, and in units of outline data, using an information processor 39.

The information processor 39 has a request count memory which has n×m memory locations (counters) where m is the number of areas (in the present embodiment, A, B and C) and n is the number of kinds of service information (n1, n2, n3, n4, ...). The information processor 39 also contains two set values I and II with which the effectiveness/ineffectiveness of the number of requests counted by the request count memory is determined. While the number of requests counted exceeds the set value I (20 in the present embodiment) or if a predetermined transmission time is reached even when the number of requests does not exceed the set value I (20), the service center 31 transmits the detail data of the service information in which the number of requests is larger than the set value II (10 in the present embodiment).

The information service which the service center 31 provides will be described next by taking the provision of news as an example with reference to the flow chart of FIG. 8. The service center 31 first broadcasts outline data of news (for example, four news items) through the transmission line 33, transmission antennas 34a, 34b and 34c towards all the areas A, B and C of FIG. 7 (step S11). This process is similar to that performed at step S1 in the first embodiment.

Then, the request count memory is cleared (step S12). Thus, the respective locations (counters) of the request count memory are set at "0" initially.

It is then determined whether the predetermined transmission time has been reached (step S13). If not, it is then determined whether a request signal has been received (step S14). The process in which it is determined at step S13 whether the predetermined transmission time has been reached and the transmission time is awaited is similar to that performed at step S6 in the first embodiment.

If no request signal has been received (step S14), control returns to step S13 where the control waits for arrival of the predetermined transmission time. If a request signal is received at step S14, the area m (A, B or C) which sent the request signal and a requested news item n (request key n1, n2, n3 or n4) are confirmed (step S15). This processing corresponds to reception of the regular request signal sent from the terminal at step T9-5 of the process performed in the terminal in the first embodiment.

In the second embodiment, subsequently to the above processing, the count of the request count memory R (m, n) corresponding to the appropriate request key n and the area m where the terminal 38 which made that request is present is incremented by one (step S16).

Figure 9:
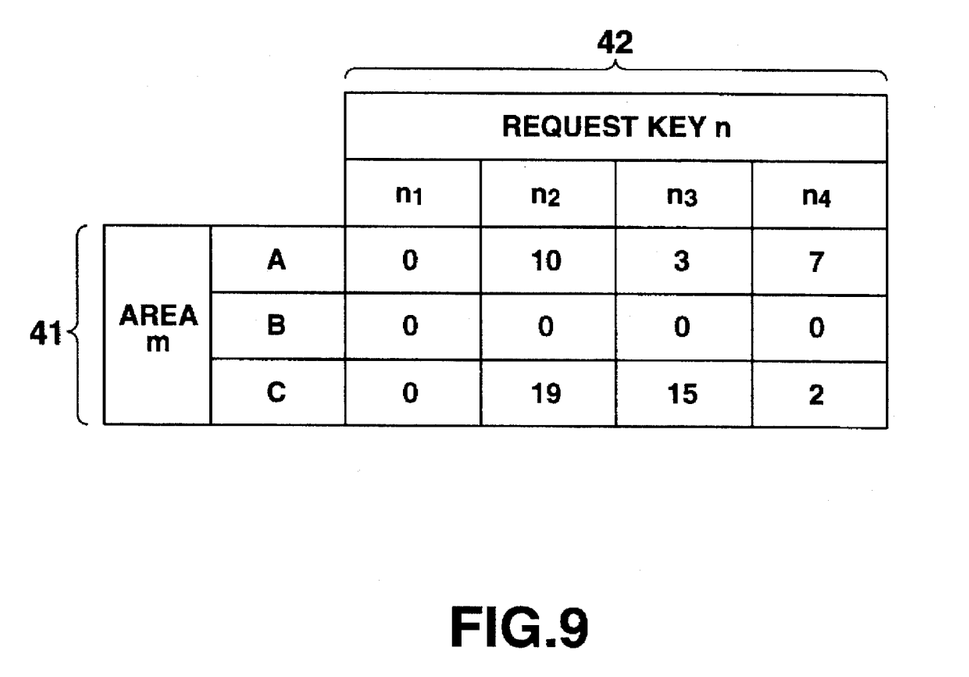
FIG. 9 schematically shows a data structure involved in information management performed by the service center in the second embodiment.

The structure of the data in the request count memory will be described next. FIG. 9 schematically illustrates the structure of the data in the request count memory for management of information which the information processor 39 performs. FIG. 9 shows areas m (m=A, B, C) as rows 41 and request keys n (n=n1, n2, n3, n4) corresponding to respective outline data as columns 42. While the service information requested by request keys n1–n4 is news in the present embodiment, it may be information on the details of tour, music, amusements, etc. As the information management data of FIG. 9, the number of requests sent from the terminals 38 and counted by the repetition of steps S13–S15 is recorded in a cell determined by a respective one of the areas m as the row 41 and a respective one of the request keys n as the column 42.

For the number of requests from the terminals, for example, in the area A, FIG. 9 shows that the number of requests for the request key n1 (the number of requests received by the service center 31) corresponding to a news item 1 is 0; that the number of requests for the request key n2 corresponding to a news item 2 is 10; that the number of requests for the request key n3 corresponding to a news item 3 is 3; and that the number of requests for the request key n4 corresponding to a news item 4 is 7.

Figure 8:
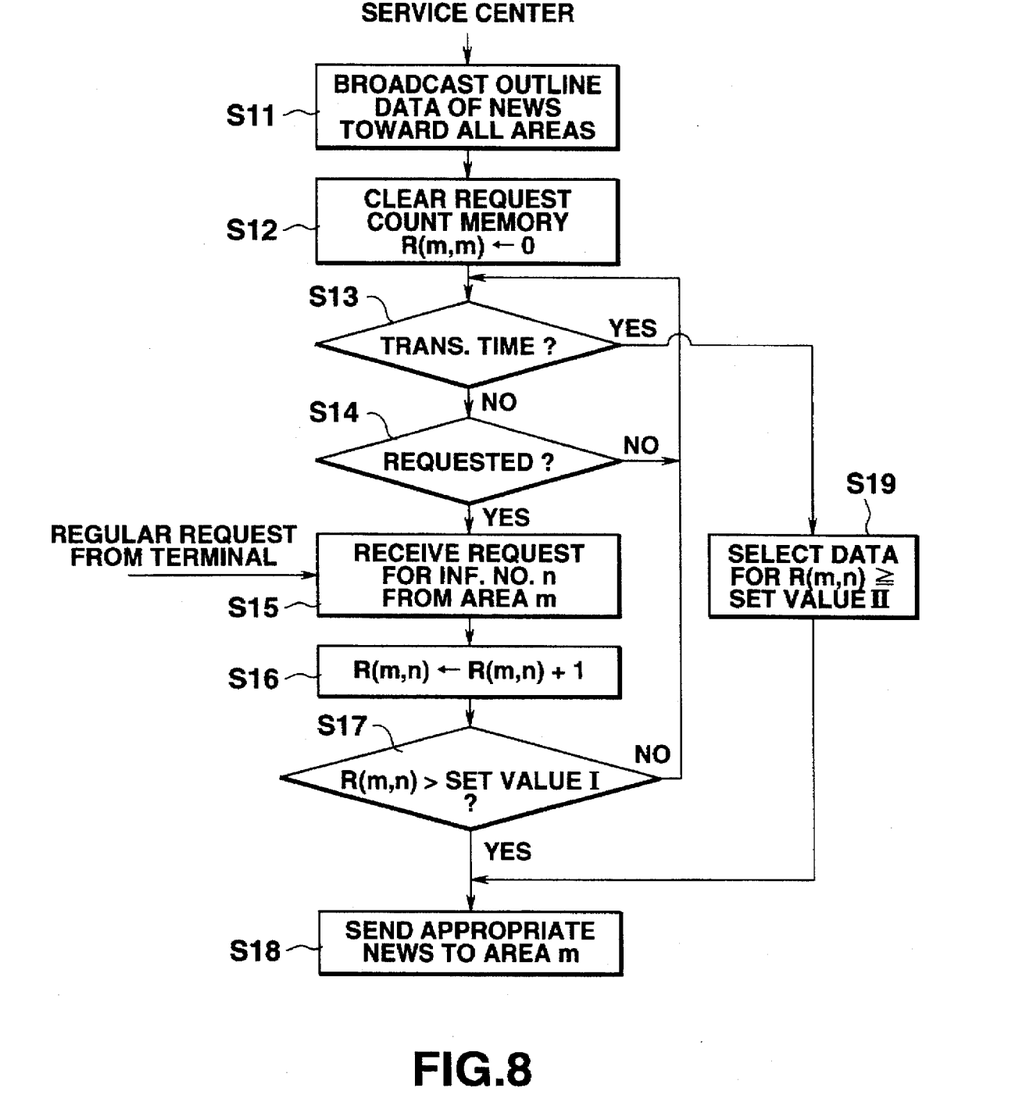
FIG. 8 is a flow chart indicative of an information service performed by a service center in the second embodiment.

Referring back to the flow chart of FIG. 8, the count of the request count memory R (m, n) which has been incremented by one by reception of a request that is received is referred to. It is then determined whether that count is larger than the set value I (step S17).

If the value is larger than the set value I (20) (step S17), detail information corresponding to the request key n is broadcasted simultaneously toward the area m (step S18). In the example of FIG. 9, the count of the request key n2 in the area C is 19, so that if there is a further request for the news item 2 from one of terminals 38c in the area C, the count becomes 20 which is larger than the set value I. Thus, corresponding detail information on the news item 2 is immediately broadcast toward the area C.

As described above, detail information for the outline data broadcast, for example, 5:00 a.m. in the morning, and having the number of requests exceeding a given number is immediately broadcast toward the appropriate area without waiting for arrival of a fixed time when the detail information is broadcast. When the user has selected a request as described in the first embodiment, a content key code to receive the selected detail information of the service information has been stored in the portable terminal. Thus, the broadcast detail information can be received easily.

When at step S17 the count of the request count memory R (m, n) has not exceeded the set value I, control immediately returns to step S13.

At step S13 when the predetermined transmission time is reached, service information (detail information) for which the count of the request count memory (m, n) has exceeded the set value II (10) is selected (step S19) and sent to the appropriate area m at step S18. In this case, the service information n2 is sent towards both areas A and C while the service information n3 is sent towards the area C alone.

As described above, according to the present embodiment, when more than the predetermined number of requests collects, the requested information is immediately sent to the appropriate area. Thus, popular information is broadcast preferentially to the major users who requested that information and earlier than to the remaining users. Thus, this method is convenient to the major users. Since information for which the number of requests is not so large but larger than a certain value is sent at a regular time, the users do not feel unsatisfactory. When the number of requests is 0, the appropriate information is not broadcast. This contributes to reduction in the communication traffic.

Third Embodiment:

The structure of the information providing system in this third embodiment is similar to that of the second embodiment of FIG. 7. The information providing system 39 of the third embodiment has a request count memory which has n x m memory locations where m denotes a plurality of areas (in the present embodiment, m=A, B or C) and n denotes a plurality of kinds of service information (n=n1, n2, n3, . . . ), as shown in FIG. 9.

In the third embodiment, the method of providing information by the service center is slightly different from that used in the second embodiment. In the third embodiment, the service center preferentially sends to the appropriate areas information in a descending order of the number of requests when the communication traffic is not crowded, which will be described next.

Figure 10:
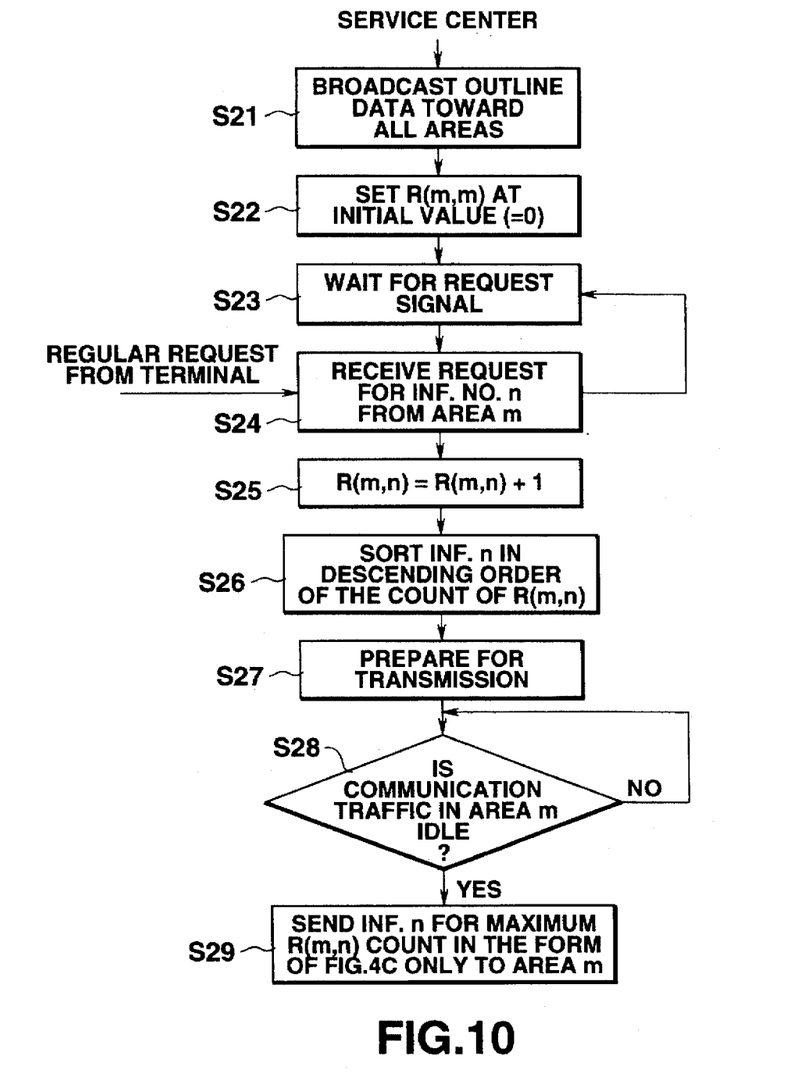
FIG. 10 is a flow chart indicative of an information service performed by a service center in a third embodiment.

FIG. 10 is a flow chart indicative of an information service provided by the service center in the third embodiment. In FIG. 10, the service center first broadcasts outline data toward all the areas (A, B, and C of FIG. 7) through the transmission line 33, antennas 34a, 34b and 34c (step S21). The service center then clears the request count memory to set "0" at the respective locations of the request count memory (step S22).

The service center then waits for arrival of a request signal (step S23). When the service center receives the request signal, it confirms the area m (A, B or C from which the request signal was sent, and the service information n requested by the request key (n1, n2, n3 or n4 (step S24), the count in the request count memory R (m, n) corresponding to the received request key n and the area m where the sending terminal 38 is present is incremented by one (step S25). Simultaneously, control returns to step S23, where it waits for the arrival of a new request signal.

If another request signal is received at step S23 performed simultaneously, the processing at steps 24 and 25 is subsequently repeated to sequentially increment the corresponding request count memory R (m, n).

Subsequently, the service information n are sorted in a descending order of the count of the request count memory (m, n) (step S26).

Figure 11:
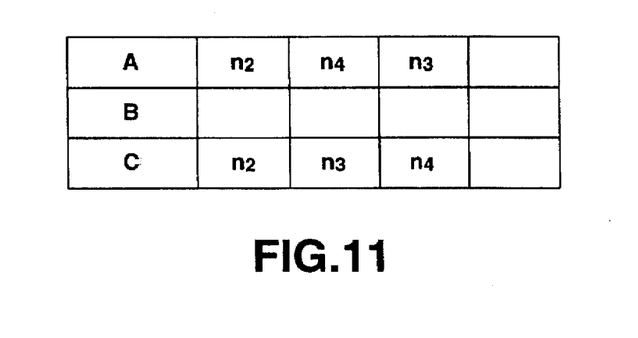
FIG. 11 schematically shows a data structure involved in information management performed by the service center in the third embodiment.

FIG. 11 illustrates the data structure obtained by the sorting. The original data (the count in the request count memory R (m, n)) which was sorted has a data structure of FIG. 9.

By sorting these counts for the respective areas in descending order, the results of the sorting are arranged in order of request keys n2, n4 and n3 in the area A, there is no corresponding data in the area B, and the results of the sorting are arranged in order of request keys n2, n3 and n4, as shown in FIG. 11.

As described above, at step S26 the request keys n are sorted for each of the areas, the results of the sorting are held and preparations for transmission are made (steps S27). While performing the above process, the service center always monitors the communication traffic for each of the areas (step S28), and the moment when the communication traffic which sends service information therethrough becomes idle is checked (NO at step S28). When the area m encounters the time at which the communication traffic becomes idle and the timing of sending service information comes to the area m (YES at step S28), service information (detail information) corresponding to a request key n for which the count is maximum in the area m is sent only to the area m (step S29). Thus, if the data structure obtained as a result of the sorting is as shown in FIG. 11, service information n2 corresponding to the request key n2 for which the count is maximum in the appropriate area A is sent first, and service information n4 is then sent at the next transmission timing.

Fourth Embodiment:

While in the third embodiment the order of transmission of information was changed on the basis of the number of requests, new information such as ten big items of news or alternatively information on good places known to few people may be prepared on the basis of the number of requests and sent.

Figure 12:
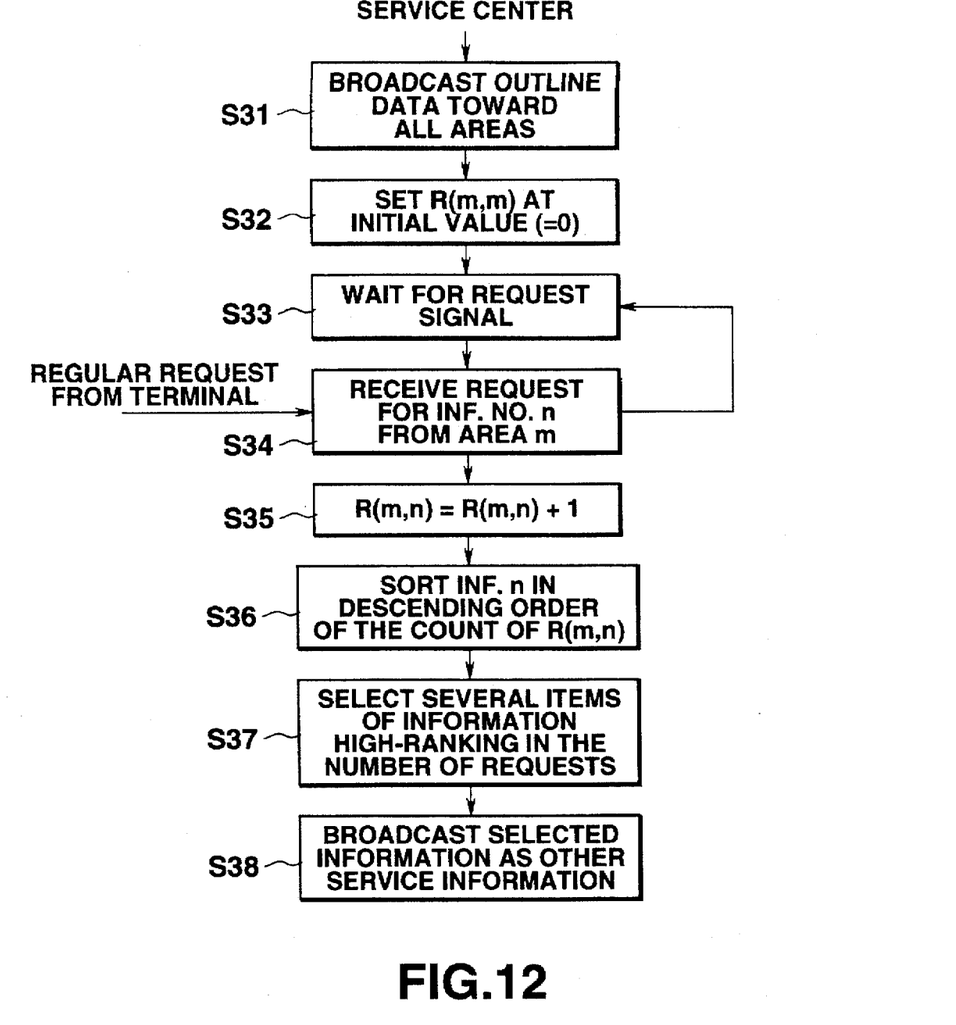
FIG. 12 is a flow chart indicative of an information service performed by a service center in a fourth embodiment.
Figure 13:
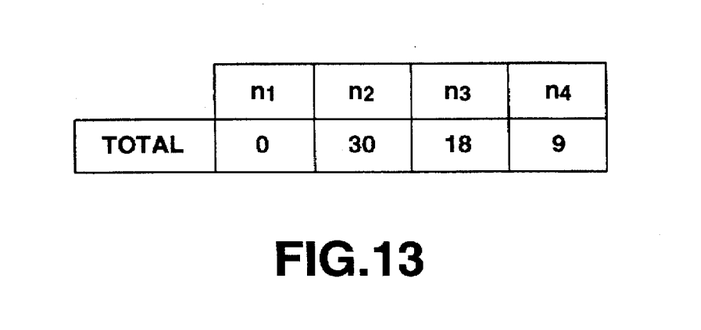
FIG. 13 schematically show a data structure involved in information management performed by the service center in the fourth embodiment.

A fourth embodiment which will be described next has such functions, just mentioned above. FIG. 12 is a flow chart indicative of an information service provided by the service center in the fourth embodiment. FIG. 13 schematically shows the data structure which the service center controls.

In FIG. 12, the processing at steps S31–S35 is the same as the processing at steps S21–S25 of the flowchart involved in the third embodiment of FIG. 10.

In the fourth embodiment, as shown at step S36 of FIG. 12, the respective counts of requests for the same item of information in the areas A, B and C are added together and the respective resulting counts of request for different items of information in the whole area which consists of the areas A, B and C are sorted and held in a descending order.

Several items of information high-ranking in the number of requests are then selected (step S37). For example, if ten items of news high-ranking in the number of requests are selected from among many items of news in the news providing service, ten "big" items of news in which the users are interested are known. Thus, the new service information which can be provided for the users is obtained.

If the service data is request keys for tour, music and amusements information, new service information such as, for example, "Good picnic places known to few people" or "Today's ten best pieces of music" can be obtained as other service information. The new information is newly broadcasted toward all the areas (step S38).

As described above, by totaling the request keys n, what information the user desired truly can be understood clearly. New service information can be obtained on the basis of the number of requests totaled for popular information and sent as additional information toward the appropriate users.

What is claimed is:

1. An information providing system using a radio network, comprising:
    a service center including:
        means for providing respective outline items of information in a first transmission and respective detail items of information in a second transmission; and
        means for attaching to each of said outline items of information and each of said detail items a corresponding key code; and
    at least one terminal including:
        selection means for enabling a user to select a desired outline item of information from among the outline items of information provided in the first transmission;
        storage means for storing the key code attached to the outline item of information selected by the selection means;
        comparison means for comparing the key code stored in said storage means with a respective one of the key codes attached to the detail items of information provided in the second transmission; and
        reception means for accepting the detail item of information whose compared key code is found to match with the key code stored in said storage means.

2. An information providing system according to claim 1, wherein the provision of the outline and detail items of information in the first and second transmissions is performed in the form of a broadcast to a plurality of terminals.

3. An information providing system according to claim 2, wherein said plurality of terminals each comprise means for making a request to said service center for sending a detail item of information; and
    said service center comprises means for specifying a terminal from which said service center received the request, and means for sending the detail item of information to said specified terminal.

4. An information providing system according to claim 1, wherein said first and second transmissions are separately executed.

5. An information providing system using a radio network, comprising:
    a service center including:
        means for providing respective outline items of information in a first transmission and respective detail items of information in a second transmission; and
        means for attaching to each of said outline items of information and each of said detail items a corresponding key code; and
    at least one terminal including:
        selection means for enabling a user to select a desired outline item of information from among the outline items of information provided in the first transmission;
        request means for making a request to said service center to provide said terminal with one of said detail items of information corresponding to the desired outline item of information selected by said selection means; and
        reception means for accepting the requested detail item of information requested by said request means; and
    wherein said service center further includes control means for controlling said providing means to provide a plurality of areas with the respective outline items of information in the first transmission and to provide only an area from which a terminal has made a request with the requested detail item of information in the second transmission.

6. An information providing system according to claim 5, wherein said service center comprises means for counting a number of requests from each of the areas and for providing a given area with the requested detail item of information in the second transmission when the counted number of requests from such an area reaches a predetermined value.

7. An information providing system according to claim 5, wherein said service center includes means for counting respective numbers of requests, means for determining respective priorities of providing detail items of information in the second transmission on the basis of the counted numbers of requests, and means for providing said at least one terminal with the requested detail items of information in the second transmission in accordance with the determined priorities.

8. An information providing system according to claim 5, wherein said service center comprises means for creating new information on the basis of a number of received requests.

9. An information providing system according to claim 5, wherein said first and second transmissions are separately executed.

10. An electronic device for use with an information providing system wherein a radio network service center provides the electronic device with respective outline items of information in a first transmission and respective detail items of information in a second transmission, said electronic device comprising:

reception means for receiving the plurality of items of information from the service center;

selection means for selecting a desired one from among the outline items of information provided in the first transmission;

key code storage means for storing a key code attached to the outline item of information selected by said selection means;

comparison means for comparing a key code stored in said key code storage means with a key code attached to each of the detail items of information provided in the second transmission, and for outputting a key code match signal when said key codes match; and accepting means for accepting a detail item of information corresponding to the outline item of information selected by said selection means from among from the detail items of information provided in the second transmission when said comparison means outputs said key code match signal.

11. An electronic device according to claim 10, further comprising:

request means for making a request to the service center to send to the electronic device an individual one of the detail items of information in accordance with directions from the electronic device; and means for receiving from the service center the requested one of the detail items of information.

12. An electronic device according to claim 11, further comprising display control means including a display integral with a tablet for selectively displaying operations of said selection means and said request means on the display.

13. An information providing system according to claim 10, wherein said first and second transmissions are separately executed.

14. An information providing method using a radio network, comprising the steps of:

a) causing a service center to provide outline items of information in a first transmission, each of said outline items of information having a corresponding key code attached thereto;

b) causing a terminal to store the key code attached to a designated one of the outline items of information;

c) causing the service center to provide detail items of information in a second transmission, each of said detail items of information having a corresponding key code attached thereto;

d) causing the terminal to compare the key codes attached to the detail items of information with the stored key code; and e) causing the terminal to accept one of said detail items of information when said comparing means matches the key code thereof with the stored key code.

15. An information providing method according to claim 14, wherein the provision of the outline and detail items of information at the steps a) and c) comprises a broadcast toward a plurality of terminals.

16. An information providing method according to claim 15, further comprising the steps of:

f) causing one of a plurality of terminals to make a request to the service center for individual transmission of one of said detail items of information to the terminal; and (g) causing the service center to recognize and designate the terminal from which the request for individual transmission is received, and to transmit the requested one of said detail items of information to the designated terminal.

17. An information providing method according to claim 14, wherein said first and second transmissions are separately executed.

18. An information providing method using a radio network, comprising the steps of:

a) causing a service center to provide a plurality of areas with outline items of information in a first transmission;

b) causing a terminal to enable a user to select a desired outline item of information from among the outline items of information provided in the first transmission;

c) causing the terminal to make a request to the service center to provide said terminal with one of said detail items of information corresponding to the selected outline item of information;

d) causing the service center to provide a specific area from which the terminal has made a request with the requested one of said detail items of information in a second transmission; and e) causing the terminal to accept the requested one of said detail items of information.

19. An information providing method according to claim 18, further comprising the steps of:

f) counting a number of requests; and g) providing an area with the requested one of said detail items of information in the second transmission only when the counted number of requests received from the area exceeds a predetermined number.

20. An information providing method according to claim 18, further comprising the step of:

f) counting a number of requests, determining a priority of providing detail items of information and providing requested detail items of information in the second transmission in accordance with the determined priority.

21. An information providing method according to claim 18, further comprising the step of:

f) creating new information on the basis of a number of requests, and providing the new information.

22. An information providing method according to claim 18, wherein said first and second transmissions are separately executed.

* * * * *